(12) United States Patent
Mukeri et al.

(10) Patent No.: US 11,656,959 B2
(45) Date of Patent: May 23, 2023

(54) DISASTER RECOVERY REGION RECOMMENDATION SYSTEM AND METHOD

(71) Applicant: DRUVA INC., Sunnyvale, CA (US)

(72) Inventors: Amir Fattemohmad Mukeri, Pune (IN); Sujit Anant Apte, Pune (IN)

(73) Assignee: DRUVA INC., Sunnyvale, CA (US)

( * ) Notice: Subject to any disclaimer, the term of this patent is extended or adjusted under 35 U.S.C. 154(b) by 644 days.

(21) Appl. No.: 16/701,704

(22) Filed: Dec. 3, 2019

(65) Prior Publication Data

US 2021/0034992 A1 Feb. 4, 2021

(30) Foreign Application Priority Data

Aug. 1, 2019 (IN) .............................. 201941031204

(51) Int. Cl.
*G06F 11/00* (2006.01)
*G06F 11/20* (2006.01)
*G06F 11/07* (2006.01)

(52) U.S. Cl.
CPC ........ *G06F 11/2023* (2013.01); *G06F 11/079* (2013.01); *G06F 11/2094* (2013.01)

(58) Field of Classification Search
CPC . G06F 11/079; G06F 11/2023; G06F 11/2094
See application file for complete search history.

(56) References Cited

U.S. PATENT DOCUMENTS

| | | | | |
|---|---|---|---|---|
| 2011/0307735 | A1* | 12/2011 | Greenberg | G06F 11/3006 714/E11.073 |
| 2013/0212422 | A1* | 8/2013 | Bauer | H04L 67/1097 714/57 |
| 2014/0351644 | A1* | 11/2014 | Garg | G06F 11/26 714/32 |
| 2017/0308421 | A1* | 10/2017 | Angeles | G06F 11/0709 |
| 2018/0107534 | A1* | 4/2018 | Angeles | G06F 11/079 |
| 2019/0163588 | A1* | 5/2019 | Anders | G06F 11/2069 |
| 2019/0171531 | A1* | 6/2019 | McBride | G06F 11/079 |
| 2019/0303235 | A1* | 10/2019 | Chittigala | G06F 11/2035 |
| 2020/0159609 | A1* | 5/2020 | Korotaev | G06F 11/0793 |
| 2020/0401473 | A1* | 12/2020 | Korotaev | G06F 11/079 |
| 2021/0034448 | A1* | 2/2021 | Raghunathan | G06F 11/079 |

\* cited by examiner

Primary Examiner — Joshua P Lottich
(74) Attorney, Agent, or Firm — IceMiller LLP

(57) ABSTRACT

A system for recommending a disaster recovery failover region of a public cloud service provider is provided. The system includes a memory having computer-readable instructions stored therein and a processor configured to execute the computer-readable instructions to detect a disaster recovery requirement for one or more clients of the public cloud service provider. The one or more clients is predicted to be affected by a disaster. The processor is further configured to monitor one or more disaster recovery (DR) factors associated with geological and meteorological conditions, legal and compliance requirements, network latency and costs for a plurality of disaster recovery regions associated with the public cloud service provider and to recommend a disaster recovery failover region for each of the one or more clients affected by the occurrence of the disaster based on the one or more DR factors.

23 Claims, 4 Drawing Sheets

DISASTER RECOVERY REGION RECOMMENDATION SYSTEM AND METHOD

PRIORITY STATEMENT

The present application claims priority under 35 U.S.C. § 119 to Indian patent application number 201941031204 filed 1 Aug. 2019, the entire contents of which are hereby incorporated herein by reference.

FIELD

The invention relates generally to disaster recovery solutions, and more particularly to, a system for recommending disaster recovery regions of a public cloud service provider.

BACKGROUND

Computer systems may be subjected to various failures in disaster events which may result in the loss of data. A disaster event occurs when a site experiences an extensive failure, such as caused by a prolonged power outage, a natural disaster, cyber-attacks, among others. To mitigate the risk of losing data, computer system users make backup copies of data stored on various storage devices. Traditionally, companies relied on data centers operated by themselves or operated by a third party data center service providers for their disaster recovery (DR) site to failover to in the event of disaster.

Cloud services provide compute, storage, and computer networking to users in form of a virtualized devices available via the Internet. In general, users access cloud platforms to store and retrieve data using web services protocols. With the advent and widespread adoption of public cloud service providers many companies have turned to public cloud service providers as preferred destination for the DR. This may be cost effective and relieves the companies of the burden of acquiring and managing the DR sites. However, the choice of DR site amongst the cloud regions operated by cloud service provider is usually random and lacks the precision on choosing the DR region that is cost effective and at the same time meets the compliance and regulatory needs.

Currently, there is no automatic way of determining nearest data center of the cloud service provider that is with minimal network latency between a primary site DR site. Moreover, since the process is manual, VM in one geographical region may get configured for DR in distant region though DR capability may be available in another region at a lower cost, leading to higher latency and increased time and costs.

In addition, the choice of DR region in this process is dependent on knowledge and understanding of customer's cloud administrator and many times the administrator may consider only one or limited factors in deciding the region to which primary site would failover to. Certain relevant factors such as network latency, cost, available capabilities, geological or meteorological disaster proneness of the cloud region may be missed in making this decision.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, a system for recommending a disaster recovery failover region of a public cloud service provider is provided. The system includes a memory having computer-readable instructions stored therein and a processor configured to execute the computer-readable instructions to detect a disaster recovery requirement for one or more clients of the public cloud service provider. The one or more clients is predicted to be affected by a disaster. The processor is further configured to monitor one or more disaster recovery (DR) factors associated with geological and meteorological conditions, legal and compliance requirements, network latency and costs for a plurality of disaster recovery regions associated with the public cloud service provider and to recommend a disaster recovery failover region for each of the one or more clients affected by the occurrence of the disaster based on the one or more DR factors.

According to another example embodiment, a system for recommending a disaster recovery region of a public cloud service provider is provided. The system includes a public cloud platform operated by a public cloud service provider. The public cloud service provider is configured to provide disaster recovery (DR) solutions to a client. The system also includes a disaster monitoring module configured to detect an occurrence of a disaster in a region having one or more data centers of the client. The system also includes a disaster recovery (DR) recommendation engine configured to access one or more DR factors associated with geological and meteorological conditions, legal and compliance requirements and costs for a plurality of disaster recovery regions associated with the public cloud service provider and to estimate a DR score for each of the plurality of disaster recovery regions using the one or more DR factors and pre-determined weightage assigned to each of the one or more DR factors. The disaster recovery (DR) recommendation engine is also configured to recommend a disaster recovery region for the client based on the estimated DR scores for each of the plurality of disaster recovery regions.

According to another example embodiment, a computer-implemented method for recommending a disaster recovery region of a public cloud service provider is provided. The method includes accessing a public cloud platform operated by the public cloud service provider. The public cloud service provider is configured to provide disaster recovery (DR) solutions to a plurality of clients. The method also includes determining one or more DR factors associated with geological and meteorological conditions, legal and compliance requirements and costs for a plurality of disaster recovery regions associated with the public cloud service provider. The method further includes recommending a disaster recovery region for each of the one or more clients affected by the occurrence of the disaster based on the one or more DR factors.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Figure 1:
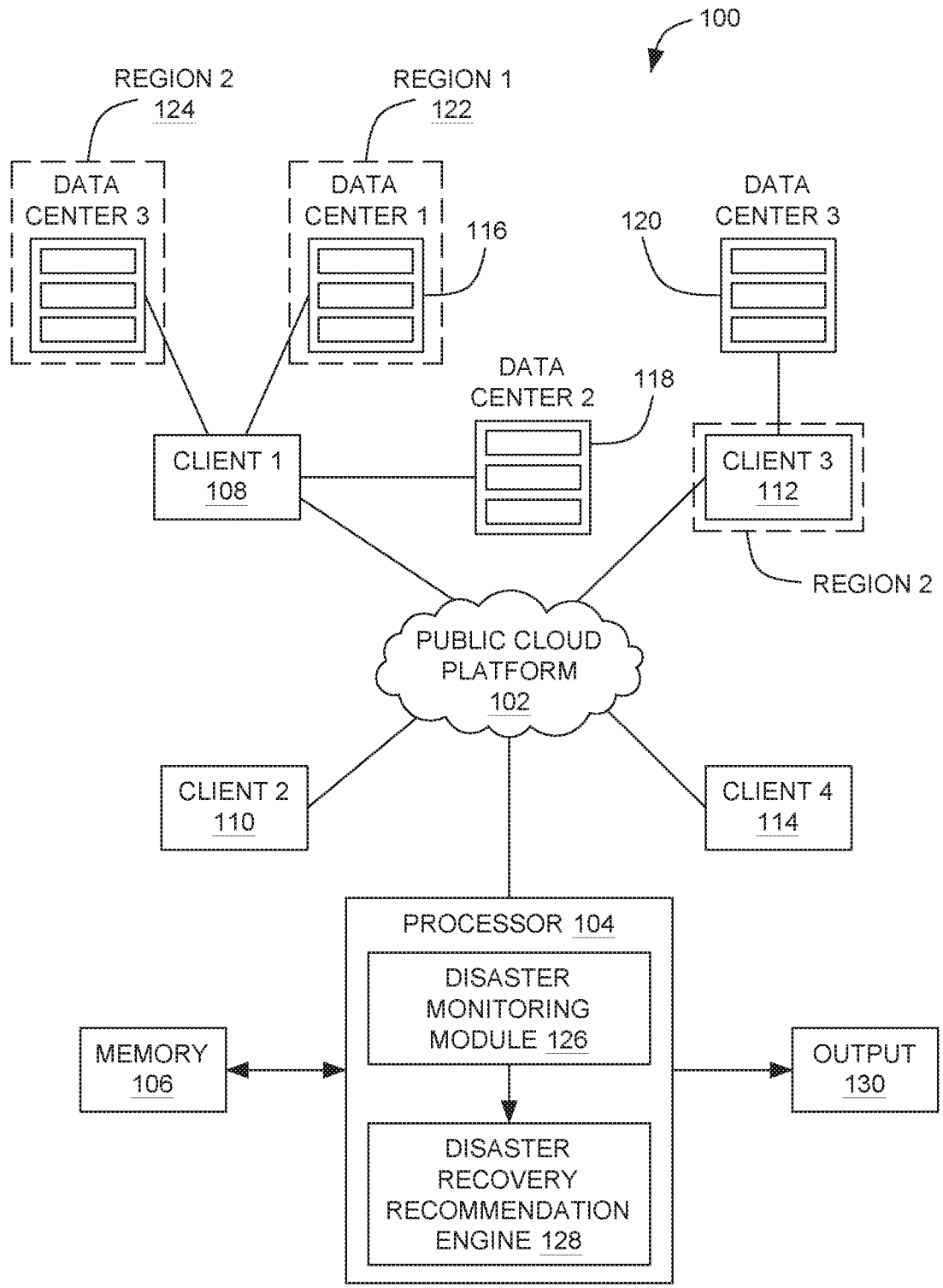
FIG. 1 illustrates a system for recommending a disaster recovery region of a public cloud service provider, according to an example embodiment.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

Accordingly, while example embodiments are capable of various modifications and alternative forms, example embodiments are shown by way of example in the drawings and will herein be described in detail. It should be understood, however, that there is no intent to limit example embodiments to the particular forms disclosed. On the contrary, example embodiments are to cover all modifications, equivalents, and alternatives thereof. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. Inventive concepts may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of inventive concepts.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in 'addition to the orientation depicted in the figures. For example, if the device in the figures is turned over, elements described as "below" or "beneath" other elements or features would then be oriented "above" the other elements or features. Thus, term such as "below" may encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The device(s)/apparatus(es), described herein, may be realized by hardware elements, software elements and/or combinations thereof. For example, the devices and components illustrated in the example embodiments of inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described example embodiments of the inventive concept may be implemented with program instructions which may be executed by computer or processor and may be recorded in computer-readable media. The media may also include, alone or in combination with the program instructions, data files, data structures, and the like. The program instructions recorded in the media may be designed and configured especially for the example embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to execute one or more software modules to perform the operations of the above-described example embodiments of the inventive concept, or vice versa.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments are generally directed to disaster recovery solutions and more particularly to, techniques for recommending disaster recovery regions of public cloud service providers based on a variety of parameters.

FIG. 1 illustrates a system 100 for recommending a disaster recovery region of a public cloud service provider. The system 100 includes a public cloud platform 102, a processor 104, and a memory 106. Each component of the system 100 is described in further detail below.

As illustrated, the system 100 includes the public cloud platform 102 operated by a public cloud service provider. The public cloud service provider may be configured to provide disaster recovery (DR) solutions to a plurality of clients such as referenced by reference numerals 108, 110, 112 and 114. Each of the plurality of clients 108, 110, 112 and 114 may have a plurality of data centers such as illustrated by reference numerals 116, 118 and 120.

The data centers 116, 118 and 120 may be geographically distributed and may include any configuration. The data centers 116, 118 and 120 may contain the resources which comprise the virtual machines running applications created to service application requests from clients 108, 110, 112 and 114.

The data centers 116, 118 and 120 may be located in different geographical locations or regions. For example, data centers 116 and 118 for the client 108 may be located in a first region 122, whereas data center 120 for the client 108 may be located in a second region 124. Each of these regions such as the first and second regions 122 and 124 may experience a disaster at some point in time. In the illustrated embodiment, the processor 104 includes a disaster monitoring module 126 configured to detect an occurrence of a disaster in a region such as the first region 122 having one or more data centers 116 and 118 of the client 108.

The disaster monitoring module 126 may be further configured to trigger a disaster recovery solution in response to occurrence of the disaster. In one example, the disaster monitoring module 126 is configured to monitor the DR factors associated with history of occurrence of the disaster, a type of the disaster, a classification of the disaster, an intensity of the disaster, a frequency of occurrence of the disaster, or combinations thereof for each of the plurality of disaster recovery regions.

In some embodiments, occurrence of a disaster may be detected based on a change in traffics flow, abnormal traffic patterns or an explicit alarm/failure indication such as a loss-of-signal indicator. In some examples, the disaster monitoring module 126 may receive inputs from exogenous sensors or inputs from a monitored data feed. For example, the exogenous sensor may be a seismograph monitor. In another example, the monitored data feed is an internet connection to a national/international tsunami or other disaster warning mechanism.

The disaster monitoring module 126 is configured to detect an occurrence of a disaster based on such DR factors. In one example, the disaster monitoring module 126 is configured to monitor the DR factors associated with occurrence of a natural disaster. Examples of natural disaster include, but are not limited to, an earthquake, a hurricane, a tsunami, or combination thereof.

Further, a disaster recovery recommendation engine 128 is configured to access one or more DR factors associated with geological and meteorological conditions, legal and compliance requirements and costs for a plurality of disaster recovery regions associated with the public cloud service provider and to recommend a disaster recovery region got each of the one or more clients 108, 110 and 112 affected by the occurrence of the disaster based on the one or more DR factors.

In another example, the disaster recovery recommendation engine 128 is configured to determine the DR factors associated with network latency between a primary site of the each of the one or more clients and the plurality of disaster recovery regions. In particular, the disaster recovery recommendation engine 128 is configured to determine the DR factors associated with network latency between the primary site of the each of the one or more clients, locations of the customers accessing the public cloud platform, and the plurality of disaster recovery regions. In one example, the disaster recovery recommendation engine 128 to determine the DR factors associated with compliance requirements of each of the one or more clients, availability of one or more features provided by the cloud service provider in the disaster recovery regions, or combinations thereof.

In the illustrated embodiment, the disaster recovery recommendation engine 128 is configured to assign a weightage to each of the DR factors associated with the geological and meteorological conditions, legal and compliance requirements and costs for a plurality of disaster recovery regions associated with the public cloud service provider. Such weightage may be assigned by the client and may be adjusted on a periodic basis. The DR factors and the pre-determined weightages may be stored in memory 106.

Further, the disaster recovery recommendation engine 128 is configured to estimate a DR score for each of the plurality of disaster recovery regions based upon the assigned weightage and to compare the DR scores for each of the plurality of disaster recovery regions to recommend the disaster recovery region for each of the one or more clients 108, 110 and 112. For example, for the data centers 116 and 118 of the client 108, if the region 122 is affected by a disaster, the disaster recovery recommendation engine 128 may recommend region 124 as a disaster recovery region. Again, this recommendation may be made based upon the variety of DR factors such as described above.

As will be appreciated by one skilled in the art, a variety of other DR factors may be considered by the disaster recovery recommendation engine 128 for recommending the disaster recovery regions for the clients 108, 110 and 112. For example, the disaster recovery recommendation engine 128 may be configured to monitor metadata of port based incoming and outgoing requests on a server hosting the DR recommendation engine 128. Further, the DR recommendation engine 128 may analyse such metadata to recommend the disaster recovery region. The recommendations for the disaster recovery regions and other details such as DR factors, DR scores and so forth may be displayed to a user using output 130.

In this embodiment, the processor 104 is further configured to initiate data recovery operations between the primary site such as region 122 of the one or more clients 108 and the recommended disaster recovery region for the respective primary site 122. In one example, one or more virtual machines, computing servers and services may be grouped for co-locating in the desired region.

Figure 2:
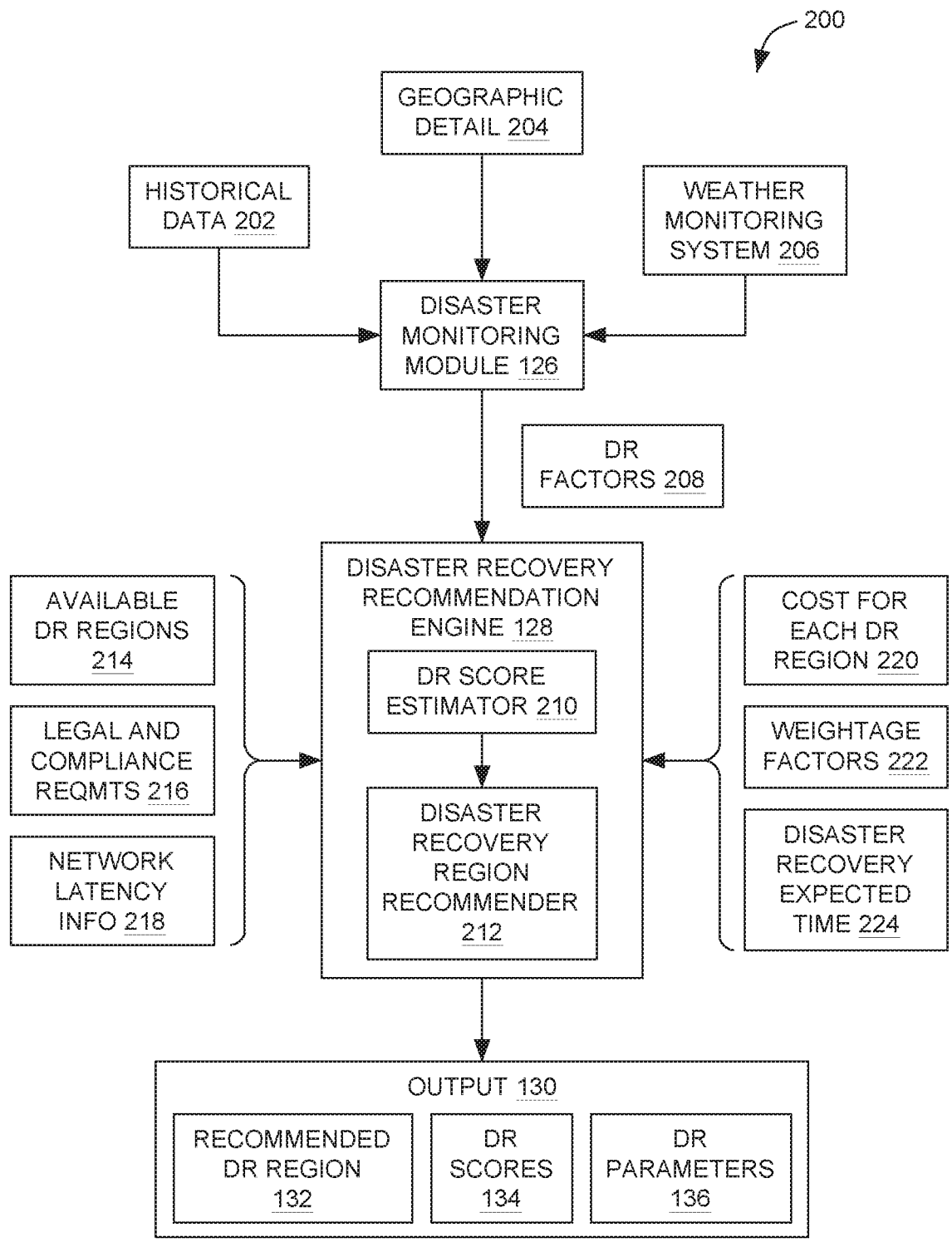
FIG. 2 illustrates an example configuration of the operation of a disaster monitoring module and a disaster recovery recommendation engine of FIG. 1, implemented according to the aspects of present technique.

FIG. 2 illustrates an example configuration 200 of the operation of the disaster monitoring module 126 and the disaster recovery recommendation engine 128 of FIG. 1. As illustrated, the disaster monitoring module 126 receives inputs regarding a primary site of a client and a plurality of disaster recovery regions to monitor occurrence of a disaster in the region. For example, the disaster monitoring module 126 receives DR factors 202 associated with history of occurrence of the disaster, a type of the disaster, a classification of the disaster, an intensity of the disaster, a frequency of occurrence of the disaster, or combinations thereof for each of the regions. The disaster monitoring module 126 also monitors other details such as geographical details 204 and meteorological conditions of the region such as received from a weather monitoring system 206. As will be appreciated by one skilled in the art, a variety of other factors may be monitored to predict probability of occurrence of a disaster in any of the DR regions. These DR factors 208 are communicated to the disaster recovery recommendation engine 128.

In the illustrated embodiment, the disaster recovery recommendation engine 128 includes a DR score estimator 210 and a disaster recovery region recommender 212. The DR score estimator 210 is configured to estimate a DR score for each of the DR regions. In operation, the DR score estimator 210 receives inputs such as available DR regions 214 for the primary site, legal and compliance requirements 216 for the DR, network latency information 218 between the primary site and the DR regions. In addition, the DR score estimator 210 receives other information such as disaster recovery costs 220 for each region, weightage factors 222 assigned to each of the DR factors, estimated disaster recovery time 224 for each region and so forth. The weightage factors 222 may be configurable by the clients and can be reviewed and updated on a periodic basis. It should be noted that the described factors may change and new factors affecting the criterion for disaster recovery may be added by the client.

The DR score estimator 210 estimates a DR score for each of the disaster recover region based upon the assigned weightage. Moreover, the disaster recovery region recommender 212 is configured to compare the DR scores for the DR regions to recommend the disaster recovery region for the client. The metrics may be displayed to a user via output 130. Such metrics and information may include recommended DR region 132, DR scores 134 for each of the regions and the DR parameters 136 considered for the estimation of the DR scores 134.

Figure 3:
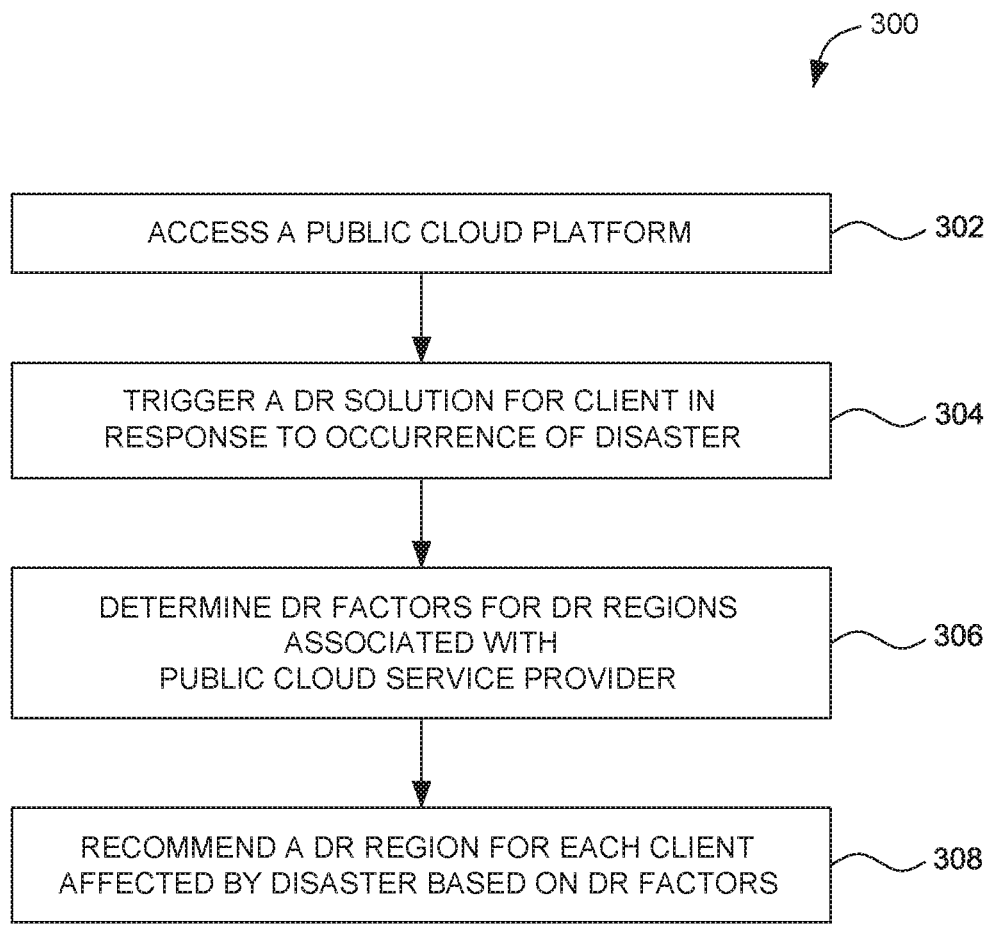
FIG. 3 is flow diagram for a process for recommending a disaster recovery region of a public cloud service provider, using the system of FIG. 1, according to the aspects of the present technique, according to the aspects of the present technique.

FIG. 3 is a flow diagram for illustrating a process 300 for recommending a disaster recovery region of a public cloud service provider, using the system 100 of FIG. 1, according to the aspects of the present technique. At block 302, a public cloud platform is accessed. The public cloud platform is operated by the public cloud service provider. In this embodiment, the public cloud service provider is configured to provide disaster recovery (DR) solutions to a plurality of clients.

At block 304, a disaster recovery solution for one or more of the clients is triggered in response to occurrence of a disaster. In one example, the disaster is a natural disaster such as an earthquake, a hurricane, a tsunami, or so forth. In other examples, the disaster may be other situations that may lead to loss of data from data centers of one or more clients, or disruption of services provided by the one or more clients. For example, a disaster may refer to a power failure scenario of a primary site.

At block 306, one or more DR factors for DR regions are determined, The DR factors are associated with geological and meteorological conditions, legal and compliance requirements and costs for a plurality of disaster recovery regions associated with the public cloud service provider. In one example, the DR factors include factors associated with history of occurrence of the disaster, a type of the disaster, a classification of the disaster, an intensity of the disaster, a frequency of occurrence of the disaster, or combinations thereof for each of the plurality of disaster recovery regions. In another example, the DR factors include factors associated with network latency between the primary site of the each of the one or more clients, locations of the customers accessing the public cloud platform, and the plurality of disaster recovery regions. In another example, DR factors include factors associated with compliance requirements of each of the one or more clients, availability of one or more features provided by the cloud service provider in the disaster recovery regions, or combinations thereof.

At block 308, a disaster recovery region for each of the one or more clients affected by the occurrence of the disaster is recommended. The disaster recovery region recommendation is based on the one or more DR factors. In this embodiment, a weightage is assigned to each of the DR factors associated with the geological and meteorological conditions, legal and compliance requirements and costs for a plurality of disaster recovery regions associated with the public cloud service provider. In an example, the weightage for each of the DR factors may be based upon business and technology requirements of each of the clients.

Moreover, a DR score for each of the plurality of disaster recovery regions is estimated based upon the assigned weightage. The DR scores for each of the plurality of disaster recovery regions are compared to recommend the disaster recovery region for each of the one or more clients.

Figure 4:
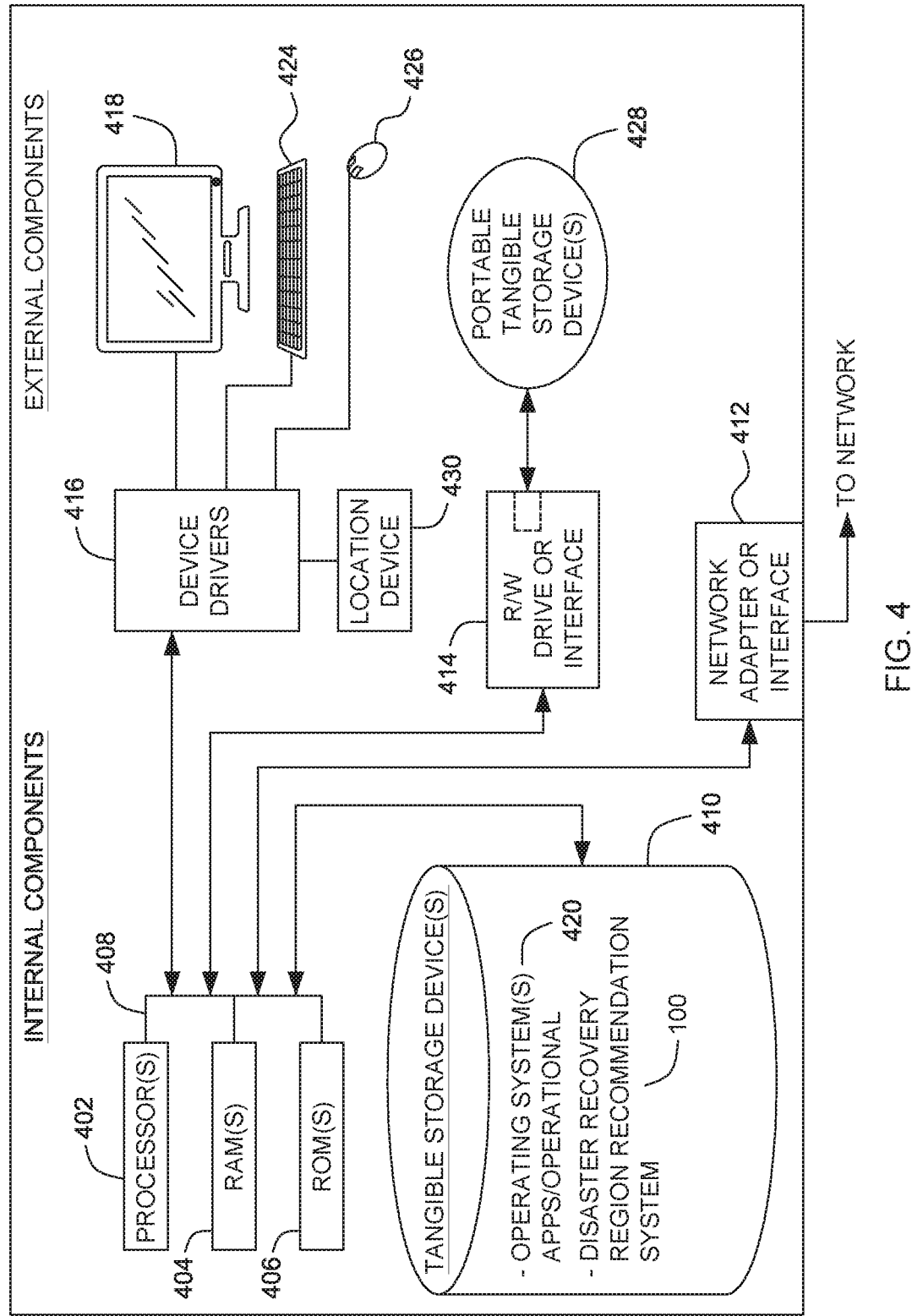
FIG. 4 is a block diagram of an embodiment of a computing device in which the modules of the system for recommending a disaster recovery region, described herein, are implemented.

The modules of the disaster recovery region recommendation 100 described herein are implemented in computing devices. One example of a computing device 400 is described below in FIG. 4. The computing device includes one or more processor 402, one or more computer-readable RAMs 404 and one or more computer-readable ROMs 406 on one or more buses 508. Further, computing device 400 includes a tangible storage device 410 that may be used to execute operating systems 420 and the storage system 100. The various modules of the storage system 100 include a storage site 104, a processor 106, memory 108 and a backup application 110. The processor 106 further includes an indexing module 120. Both, the operating system 420 and the storage system 100 are executed by processor 402 via one or more respective RAMs 404 (which typically includes cache memory). The execution of the operating system 420 and/or the system 100 by the processor 402, configures the processor 402 as a special purpose processor configured to carry out the functionalities of the operation system 420 and/or the storage system 100, as described above.

Examples of storage devices 410 include semiconductor storage devices such as ROM 506, EPROM, flash memory or any other computer-readable tangible storage device that may store a computer program and digital information.

Computing device also includes a R/W drive or interface 414 to read from and write to one or more portable computer-readable tangible storage devices 428 such as a CD-ROM, DVD, memory stick or semiconductor storage device. Further, network adapters or interfaces 412 such as a TCP/IP adapter cards, wireless Wi-Fi interface cards, or 3G or 4G wireless interface cards or other wired or wireless communication links are also included in computing device.

In one example embodiment, the system 100 which includes a, a processor 104 with the disaster monitoring module 126 and the disaster recovery recommendation engine 128, and memory 106, may be stored in tangible storage device 410 and may be downloaded from an external computer via a network (for example, the Internet, a local area network or other, wide area network) and network adapter or interface 412.

Computing device further includes device drivers 416 to interface with input and output devices. The input and output devices may include a computer display monitor 418, a keyboard 424, a keypad, a touch screen, a computer mouse 426, and/or some other suitable input device.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The aforementioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The example embodiment or each example embodiment should not be understood as a limiting/restrictive of inventive concepts. Rather, numerous variations and modifications are possible in the context of the present disclosure, in particular those variants and combinations which may be inferred by the person skilled in the art with regard to achieving the object for example by combination or modification of individual features or elements or method steps that are described in connection with the general or specific part of the description and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure.

Still further, any one of the above-described and other example features of example embodiments may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one example embodiment relates to a non-transitory computer-readable storage medium comprising electronically readable control information (e.g., computer-readable instructions) stored thereon, configured such that when the storage medium is used in a controller of a magnetic resonance device, at least one example embodiment of the method is carried out.

Even further, any of the aforementioned methods may be embodied in the form of a program. The program may be stored on a non-transitory computer readable medium, such that when run on a computer device (e.g., a processor), cause the computer-device to perform any one of the aforementioned methods. Thus, the non-transitory, tangible computer readable medium is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it may be separated from the computer device main body. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

The invention claimed is:

1. A system for recommending a disaster recovery failover region of a public cloud service provider, the system comprising:
   a memory having computer-readable instructions stored therein;
   a processor configured to execute the computer-readable instructions to:
      detect a disaster recovery requirement for one or more clients of the public cloud service provider, wherein the one or more clients is predicted to be affected by a disaster;
      access one or more disaster recovery (DR) factors associated with at least one of geological conditions, compliance requirements, or network latency for a plurality of DR failover regions associated with the public cloud service provider;
      estimate a DR score for each of the DR failover regions using the one or more accessed factors;
      recommend at least one of the DR failover regions for each of the one or more clients based on the estimated DR scores; and
      before an occurrence of the disaster, facilitate replication of computing and storage from a primary region associated with the public cloud service provider to the at least recommended DR failover region.

2. The system of claim 1, wherein the one or more clients are remote from the DR failover regions.

3. The system of claim 1, wherein the processor is further configured to execute the computer-readable instructions to facilitate the replication via direct copy, full backup or incremental backup of the data, storage & networking infrastructure to the site in recommended DR region.

4. The system of claim 1, wherein the processor is configured to execute the computer-readable instructions to monitor the DR factors associated with a history of occurrence of the disaster, a type of the disaster, a classification of the disaster, an intensity of the disaster, a frequency of occurrence of the disaster, or combinations thereof for each of the plurality of disaster recovery regions.

5. The system of claim 4, wherein the processor is configured to execute the computer-readable instructions to monitor the DR factors associated with occurrence of a natural disaster, a man-made disaster, or combinations thereof.

6. The system of claim 5, wherein the processor is configured to execute the computer-readable instructions to monitor the DR factors associated with occurrence of an earthquake, a hurricane, a tsunami, or combination thereof.

7. The system of claim 5, wherein the processor is configured to execute the computer-readable instructions to monitor the DR factors associated to cyber attacks.

8. The system of claim 1, wherein the network latency is between the primary region and the DR failover regions.

9. The system of claim 8, wherein the network latency is between the primary region for each of the one or more clients, locations of customers accessing the public cloud service provider, and the DR failover regions.

10. The system of claim 1, wherein the processor is configured to execute the computer-readable instructions to determine the DR factors associated with compliance requirements of each of the one or more clients, availability of one or more features provided by the cloud service provider in the disaster recovery regions, or combinations thereof.

11. The system of claim 1, wherein the processor is configured to execute the computer-readable instructions to:
   assign a weightage to each of the one or more DR factors associated with the geological conditions, meteorological conditions, legal requirements, the compliance requirements, and costs for the DR failover regions associated with the public cloud service provider;
   wherein the DR scores are estimated based upon the assigned weightage; and
   compare the DR scores for each of the DR failover regions to recommend the at least one DR failover region for each of the one or more clients.

12. The system in claim 1, wherein the processor is configured to execute the computer-readable instructions to implement a DR test of sample test infrastructure of the at least one recommended DR failover region.

13. The system of claim 1, wherein the processor is further configured to execute the computer-readable instructions to group one or more virtual machines, computing servers and services for co-locating in the desired region.

14. A system for recommending a disaster recovery region of a public cloud service provider, the system comprising:
- a public cloud platform operated by a public cloud service provider, wherein the public cloud service provider is configured to provide disaster recovery (DR) solutions to a client;
- a disaster monitoring module configured to detect an occurrence of a disaster in a primary region having one or more data centers associated with the public cloud service provider; and
- a disaster recovery (DR) recommendation engine configured to:
  - access one or more DR factors associated with at least one of geological conditions or compliance requirements for a plurality of DR failover regions associated with the public cloud service provider;
  - estimate a DR score for each of the DR failover regions using the one or more DR factors and pre-determined weightage assigned to each of the one or more DR factors;
  - recommend at least one of the DR failover regions for the client based on the estimated DR scores; and
  - before the occurrence of the disaster, facilitate replication of computing and storage from the primary region associated with the public cloud service provider to the at least one recommended DR failover region.

15. The system of claim 14, wherein the disaster monitoring module is configured to monitor the DR factors associated with a history of occurrence of the disaster, a type of the disaster, a classification of the disaster, an intensity of the disaster, a frequency of occurrence of the disaster, or combinations thereof for each of the plurality of disaster recovery regions.

16. The system of claim 15, wherein the disaster monitoring module is configured to monitor a cyberattack, an earthquake, a hurricane, a tsunami, or combination thereof.

17. The system of claim 14, wherein the disaster recovery (DR) recommendation engine is further configured to group one or more virtual machines, computing servers and services for co-locating in the desired region.

18. The system of claim 14, wherein the disaster recovery (DR) recommendation engine is further configured to:
- monitor metadata of port based incoming and outgoing requests on a server hosting the DR recommendation engine; and
- analyse the metadata to recommend the disaster recovery region.

19. A computer-implemented method for recommending at least one disaster recovery (DR) failover regions of a public cloud service provider, the method comprising:
- accessing a public cloud platform operated by the public cloud service provider, wherein the public cloud service provider is configured to provide DR solutions to a plurality of clients;
- determining one or more DR factors associated with at least one of geological conditions or compliance requirements for a plurality of DR failover regions associated with the public cloud service provider;
- estimating a DR score for each of the DR failover regions using the one or more determined factors;
- recommending the at least one DR failover region for each of the one or more clients based on the estimated DR scores; and
- before an occurrence of the disaster, facilitating replication of computing and storage from a primary region associated with the public cloud service provider to the at least recommended DR failover region.

20. The computer implemented method of claim 19, further comprising:
- assigning a weightage to each of the one or more DR factors associated with the geological conditions, meteorological conditions, legal requirements, the compliance requirements, and costs for the DR failover regions associated with the public cloud service provider;
- wherein the DR scores are estimated based upon the assigned weightage; and
- comparing the DR scores for each of the DR failover regions to recommend the at least one DR failover region for each of the one or more clients.

21. The computer implemented method of claim 20, further comprising determining the weightage for each of the DR factors based upon business and technology requirements of each of the clients.

22. The computer implemented method of claim 19, further comprising determining the DR factors associated with network latency between the primary site of the each of the one or more clients, locations of the customers accessing the public cloud platform, and the plurality of disaster recovery regions.

23. The computer implemented method of claim 19, further comprising determining the DR factors associated with compliance requirements of each of the one or more clients, availability of one or more features provided by the cloud service provider in the disaster recovery regions, or combinations thereof.

* * * * *